United States Patent

Näkk

[11] 3,918,277
[45] Nov. 11, 1975

[54] BEARING ASSEMBLY
[75] Inventor: Lembit Näkk, Goteborg, Sweden
[73] Assignee: SKF Industrial Trading and Development Company B.V., Jutphaas, Netherlands
[22] Filed: Dec. 7, 1973
[21] Appl. No.: 422,979

Foreign Application Priority Data
Nov. 13, 1972  Sweden .......................... 14678

[52] U.S. Cl. .............. 68/140; 259/DIG. 16; 259/89
[51] Int. Cl.² .......................................... D06F 37/30
[58] Field of Search ...... 68/140; 259/DIG. 16, 81 R, 259/81 A, 89, 90; 69/30; 308/22, 233, 178, 189 R; 34/139; 254/150 R, 169

[56] References Cited
UNITED STATES PATENTS

| | | | |
|---|---|---|---|
| 1,613,895 | 1/1927 | Kitchell | 254/169 |
| 2,963,892 | 12/1960 | Edwards | 68/140 |
| 3,199,318 | 8/1965 | Sullivan et al. | 68/140 |
| 3,270,529 | 9/1966 | Engel | 68/140 X |
| 3,642,253 | 2/1972 | Baldwin | 254/150 R |
| 3,799,005 | 3/1974 | Koehler | 254/150 R |

*Primary Examiner*—Harvey C. Hornsby
*Assistant Examiner*—Philip R. Coe
*Attorney, Agent, or Firm*—Howson and Howson

[57] ABSTRACT

In apparatus for tumbling material comprising a drum having at least one end wall, a support member, a bearing assembly rotatably mounting the drum relative to the support member and drive means for rotating the drum through the bearing assembly, wherein the improved bearing assembly comprises a first, inner shaft member having means adjacent one end for non-rotatably securing it to the support member, a second outer shaft member circumscribing said first shaft member and radially spaced therefrom to define an annular space between said shaft members, means for non-rotatably securing said second outer shaft member to the end wall of the drum at an end thereof opposite said one end of said first shaft member, means for operatively connecting the opposite end of said second outer shaft member to the drive means and a plurality of rolling elements in the annular space between said shaft members supporting said shaft members for relative rotation whereby actuation of the drive means causes rotation of said outer shaft member relative to said inner shaft member to rotate the drum.

24 Claims, 6 Drawing Figures

FIG.6.

BEARING ASSEMBLY

BACKGROUND OF THE INVENTION

The present invention relates to an improved bearing assembly particularly adapted for use in apparatus for tumbling material to rotatably support the drum member of such apparatus.

Such bearing assemblies are widely known - see for instance the German Auslegeschrift 1.460.896 - and usually comprise a bearing housing secured to the liquid receptacle of a washing machine and containing two ball bearings and a drive shaft, one end of which is non-rotatable secured to a belt pulley. The bearing housing also contains one or more lip seals rubbing against the rotating shaft which are to prevent dirty water from penetrating from the receptacle in to the ball bearings in the bearing housing. During operation these seals are worn as a result of the rubbing against the rotating shaft and after a certain time of operation the seals will not provide complete sealing effect.

SUMMARY OF THE INVENTION

In accordance with the present invention a bearing assembly is provided characterized by novel features of construction and arrangement which effectively eliminates the problems inherent in the prior assemblies discussed above. The bearing assembly, which is particularly adapted for use in an apparatus for tumbling materials comprising a support member, a drum and drive means for rotating the drum through the bearing assembly, includes an inner shaft member non-rotatably secured at one end to the support member, a second outer shaft member circumscribing the first shaft member and non-rotatably secured to the end wall of the drum at a terminal end thereof opposite the one end of the first shaft member and operatively connected at its opposite end to the drive means and a plurality of rolling elements in the annular space between the shaft members supporting the shaft members for relative rotation. By this arrangement, actuation of the drive means which may consist of a belt drive transmission connected to a pulley supported on the outer shaft member causes rotation of the outer shaft member relative to the inner shaft member to rotate the drum.

BRIEF DESCRIPTION OF THE DRAWINGS

Other features and their advantages will be further explained below in connection with the description of a preferred embodiment of the invention with reference to the accompanying drawings.

Figure 1:
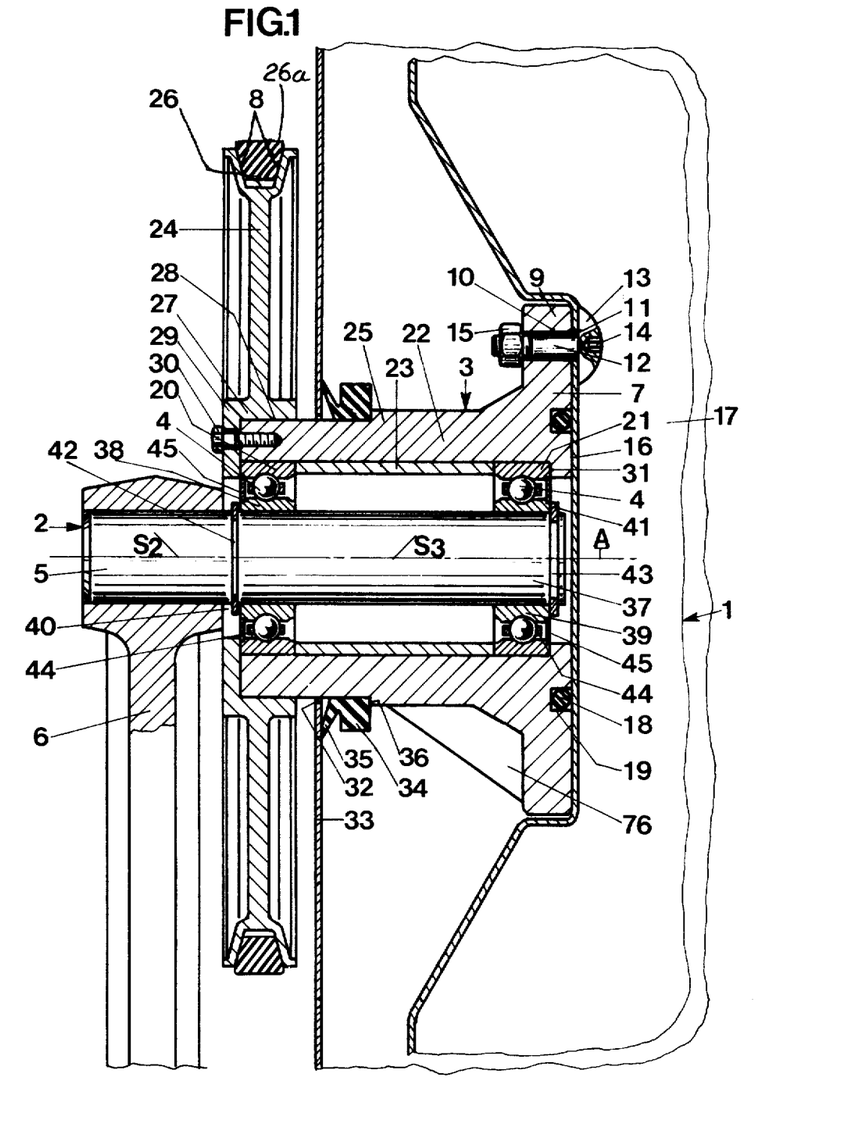
FIG. 1 is a longitudinal section of an embodiment of the bearing assembly according to the present invention when mounted in a washing machine.

FIG. 1 shows a bearing assembly for a washing machine drum 1 rotatable around a predetermined axis A, which in the embodiment illustrated is horizontal. The bearing assembly comprises a first inner shaft member 2, a second outer shaft member 3, and a plurality of rolling elements 4 arranged between and in contact with the shaft members 2 and 3 to permit rotation of the outer shaft member 3 around the inner shaft member 2.

The inner shaft member 2 is, at least substantially, rotationally symmetrical and has one end 5, which is adapted so as to be carried non-rotatably by a supporting member 6 for the bearing assembly and the drum 1 in such a way that the symmetry axis $S_2$ of the inner shaft member is aligned with the predetermined axis A. The supporting member 6 in the illustrated embodiment consists of a cast light metal frame, into which said end 5 of the inner shaft member 2 is cast. In normal cases the end 5 can be circular-cylindrical as illustrated, but in some cases an exceptionally strong attachment of the inner shaft member 2 to the frame 6 may be necessary and the end 5 can then be provided with projections or recesses, as e.g. radially and/or axially running ridges or grooves (not shown). The outer shaft member 3, which in this embodiment is of tubular shaft type, has an inner surface which is at least essentially rotationally symmetrical, and it surrounds the inner shaft member 2 radially in such a way that the symmetry axis $S_3$ of its inner surface coincides with the symmetry axis $S_2$ of the inner shaft member 2.

The end 7 of the outer shaft member 3, opposite to the aforementioned end 5 of the inner shaft member 2, is adapted to be attached non-rotatably to the drum 1, and this opposite end 7 is - at least when attached to the drum 1 - entirely sealed against the environment. Furthermore, the outer shaft member 3 has a substantially annular surface portion 8. This portion section 8 is adapted to be engaged by a drive, which is not shown in the figure (in the embodiment as per FIG. 1 this drive is supposed to be a V-belt), for rotation of the outer shaft member 3 and the drum 1.

The non-rotatable attachment of the outer shaft member 3 to the drum 1 can be made according to several well-known methods. The outer shaft member 3 at the aforementioned opposite end 7 is preferably provided with a mounting flange 9 extending radially outwards and having a number of axial through holes 10 evenly distributed around the periphery. The drum 1 is provided with holes 11 corresponding to the holes 10 and through these holes 10 and 11 fasteners such as screws 12 (of which one is shown) or rivets (see FIGS. 2 and 3) are extending. If the mounting flange 9 has sufficient thickness, its holes 10 need not be through holes but can be threaded bottom holes. In the shown embodiment the screw 12 has a socketed head 13 with a central recess 14 for a socket screw key so that the screw does not wear on the laundry in the drum, and a nut 15 is screwed on to the threaded end of the screw 12 and presses the mounting flange 9 against the drum 1.

The drum 1 has a circular rear wall 16 and a circular-cylindrical casing 17 secured to the periphery of said rear wall. The wall 16 is non-perforated and screwed on to or riveted to the mounting flange 9, while the casing 17 is perforated with a multiplicity of holes, which are not shown in the figure. Furthermore, the mounting flange 9 does not as a rule reach the normal water level of the washing machine. Even if said opposite end 7 of the outer shaft member 3 is open, as shown in FIG. 1, so that at this end 7 the bearing assembly is sealed only when mounted against the drum wall 16, sufficient protection from splashing water penetrating between the mounting flange 9 and the drum wall 16 into the vital parts of the bearing assembly will in most cases be attained by said mounting.

However, since due to some fault the water level in the washing machine may be too high, a safer sealing is preferred. Such a sealing can be obtained in many ways. FIG. 1 shows an O-ring 18 which is pressed axially between the mounting flange 9 and the drum wall 16.

Figure 2:
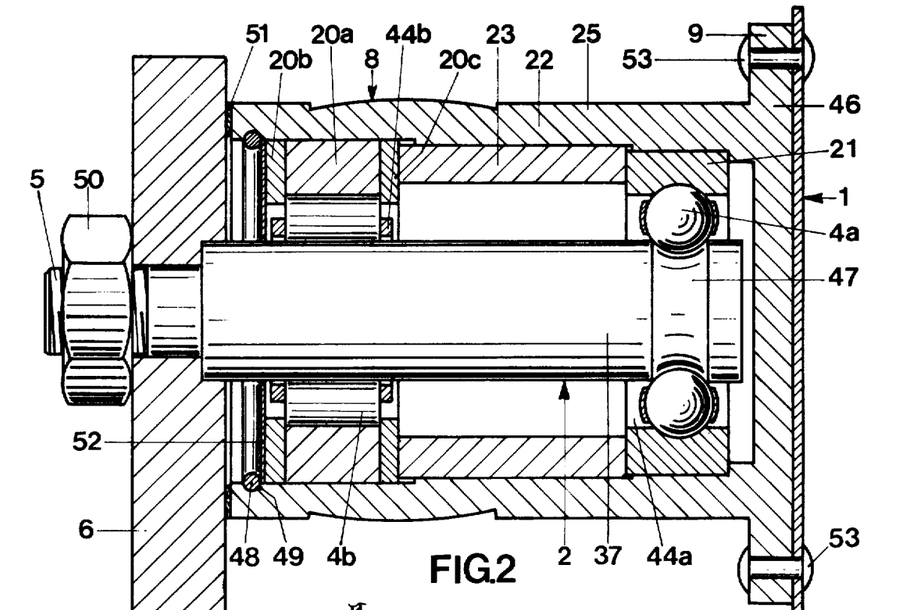
FIG. 2 is a longitudinal section of a modified embodiment of the bearing assembly.
Figure 3:
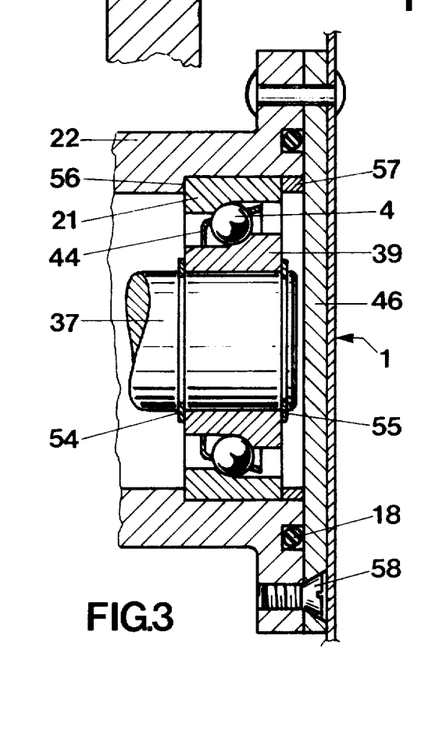
FIGS. 3 and 4 are longitudinal sections of further modified components of the bearing assembly.
Figure 4:
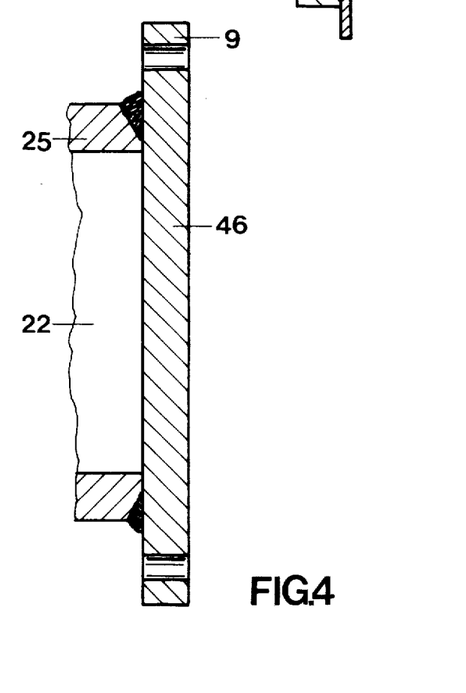

The ring is placed in a groove 19 in the mounting flange 9. It is known that an O-ring is an excellent element for static sealing, i.e the sealing of a gap between two surfaces which are stationary in relation to each other, but the O-ring 18 can of course be replaced by other sealing means. FIGS. 2–4 show other possibilities of preventing water from penetrating into the bearing assembly.

In the embodiment according to FIG. 1 the outer shaft member 3 comprises two spaced outer race rings 20 and 21 for the rolling elements which are balls 4 evenly divided among the outer rings, a bearing housing 22 surrounding and supporting the outer rings 20 and 21 in the radial direction, a distance ring 23 arranged between the outer rings 20 and 21 to maintain the distance between them, and a belt pulley 24 secured to the bearing housing 22. The bearing housing 22 is cast and has an essentially tubular body 25, and the mounting flange is integral with the body 25. A plurality of radially extending, substantially triangular reinforcement members 76 are provided in the transition between the body 25 and the mounting flange 9. The inner surface of the bearing housing 22 consists of a stepped bore with constant diameter over the whole of its length, except for the portion adjacent the drum 1 where the diameter is smaller. The belt pulley 24 is cast of light metal and has a V-groove 26, the sides of which constitute the annular surface portion 8 adapted to be engaged by a drive, i.e. a V-belt 26a. The belt pulley 24 has furthermore a hub 27 with a bore 28, the daimeter of which matches the diameter of the bearing housing 22 at the end positioned next to the support 6. At one end of the belt pulley hub 27 an annular flange 29 extends radially inwards. A number of screws 30, one of which is shown, pass through axial holes provided in the flange 29 and are screwed into threaded bores in the end face of the bearing housing positioned next to the support 6, thus securing the belt pulley 24 relative to the bearing housing 22.

Upon tightening of the screws 30 the outer race rings 20 and 21 will be secured against any axial displacement inside the bearing housing 22 in that the axial pressure exerted by the belt pulley flange 29 will be transmitted through one outer race ring 20, the intermediate distance ring 23 and the other outer race ring 21 to the shoulder 31 at that end of the bearing housing which faces the drum.

When the bearing assembly is used for a washing machine - see FIG. 1 - the outer shaft member 3 or the bearing housing 22 extends through an opening 32 in the rear wall 33 of a liquid receptacle surrounding the drum 1 in such a way that the belt pulley 24 or a similar transmission means will be outside the receptacle. A seal 34 prevents liquid from leaking out through the opening 32 from the interior of the receptacle. In the embodiment shown in FIG. 1 this seal consists of a V-ring 34 placed on the outer shaft member 3 or the bearing housing 22 inside the receptacle and having a sealing lip 35 in sealing engagement with the receptacle wall 33 around the opening 32. The V-ring 34 is supported axially towards the drum 1 by an annular shoulder 36 so that the sealing lip 35 presses against the inside of the receptacle wall 33.

In the embodiment according to FIG. 1 the inner shaft member 2 comprises a shaft 37 with an essentially constant diameter and two inner race rings 38 and 39 for the balls 4, these rings being mounted on the shaft 37 and spaced from each other. Moreover, there are two snap rings 40 and 41, e.g. Seeger-rings, positioned in grooves 42 and 43 axially outside the inner rings 38 and 39 on the shaft 37 to prevent the inner rings from moving away from each other. The inner rings 38 and 39 together with the balls 4, cages 44 and the outer rings 20 and 21 form two deep groove ball bearings, one of which is placed near the belt pulley 24 and the other one near the mounting flange 9 of the bearing housing.

The deep groove ball bearing at the belt pulley side is on the side which faces the frame 6 provided with a conventional seal 45 which prevents dirt from penetrating into and lubricant from leaking out of the bearings, and it is recommended that also the deep groove ball bearing at the mounting flange 9 side be equipped with such a seal 45 on the side facing the drum 1. The space between the ball bearings serves as a lubricant reservoir and in cases where relubrication is requested it is easy to arrange a lubrication nipple in the free end face of the shaft 37 - furthermost to the left in FIG. 1 - and a lubrication duct which leads from there and opens into the space between the ball bearings.

The bearing assembly according to FIG. 2 differs in many respects from the one described above. The bearing housing 22 is also in this case cast and has an essentially tubular body 25 and a mounting flange 9, but the mounting flange 9 is the outermost portion of a sealing flange 46 which is integral with the body 25 and completely seals the end face of the bearing housing 22 next to the drum 1 against the environment. If desired the sealing flange 46 may - as shown in FIG. 4 - also be welded on to the body 25 of the bearing housing.

With these embodiments it is entirely impossible for impurities to penetrate into the bearing assembly at the end facing the drum 1. FIG. 2 also illustrates that rivets 53 can be used for securing the drum 1 to the bearing housing 22 and that - in certain applications - the belt pulley 24 can be excluded and be replaced by a surface portion 8 shaped direct in the tubular body 25 of the bearing housing and adapted for driving by means of a flat belt, which is not shown in the figure. The surface portion or the belt track 8 is preferably crowned to compensate for possible small errors in the geometry of the belt transmission. In some applications a gear or chain transmission could also be used for rotating the drum 1 and in that case a gear ring (not shown) replaces the belt pulley. The gear surface then constitutes the mainly annular surface portion 8 which is intended to be engaged by a drive.

Another important difference is that the bearing assembly according to FIG. 2 is of journal bearing type, i.e. the inner shaft member 2 does not carry any race rings for the rolling elements 4. The inner shaft member 2 instead consists of a hardened and ground steel shaft 37 with integral raceways for the rolling elements, which are of two kinds - balls 4a and rollers 4b. The balls 4a are part of a bearing of type deep groove ball bearing, the outer raceway of which is located in an outer race ring 21, which is fitted into the bearing housing 22 and whose inner raceway consists of a groove 47 in the shaft 37. The ball bearing further contains a cage 44a. The rollers 4b are essentially cylindrical and are part of a roller bearing, the outer raceway of which is located in an outer race ring member fitted into the bearing housing 22 and consisting of an outer race ring 20a and two loose flanges 20b and 20c which guide the rollers axially. The inner raceway of the roller bearing consists of the shaft 37. Also in the roller bearing there is a cage 44b for the rollers 4b. In order to facilitate the assembling of the bearing assembly the inside of the bearing housing 22 is made as a stepped bore the diameters of which increase towards the open end of the bearing housing. As in the embodiment according to FIG. 1 a spacer ring 23 is used to keep the bearings separated from each other in axial direction, but a locking snap ring 48 placed in an inner groove 49 at the open end of the bearing housing 22 is used in order to prevent the bearings from being axially displaced inside the bearing housing. The position of the bearings relative to each in the bearing housing 22 is of a minor importance and it is quite possible to use a roller bearing next to the drum 1 and a ball bearing next to the support 6.

The end 5 of the shaft 37 which protrudes from the bearing housing 22 has a reduced diameter and is threaded at the distal end for securing the shaft to the support 6 by means of a shaft nut 50 which engages the thread. FIG. 2 also reveals that the axial end face of the bearing housing 22, which faces the frame 6, is provided with a seal 51 protecting against dirt. This seal consists of an electrostatically deposited coating of nylon fibre flock, glued onto said axial end face. The length of the fibres is such that the fibers contact a surface of the support 6, which for this reason is larger at the top than the support shown in FIG. 1. Moreover, a seal 52 is arranged between the locking snap ring 48 and the outer loose flange 20b to prevent the lubricant from leaking out of the bearing assembly.

FIG. 3 shows how the ball bearing next to the drum 1 has been replaced by a single row angular contact ball bearing having an outer ring 21 fitted in the bearing housing 22, a plurality of balls 4, a cage 44 and an inner ring 39 mounted on the shaft 37. The raceways of the inner and outer rings are displaced axially relative to each other in such a way that the raceway of the inner ring 39 is positioned next to the drum 1. Also the other bearing in the bearing assembly has been replaced by an angular contact ball bearing (not shown) with the reverse orientation, i.e. the space between the raceways of the inner rings is larger than the space between the raceways of the outer rings. Thus the axial construction length of the bearing assembly can be reduced without foregoing the demands for stability. The inner ring 39 is axially fixed on the shaft 37 by means of two locking snap rings 54 and 55, and the outer ring 21 is axially fixed by means of a shoulder 56 in the bearing housing and a spacer ring 57. A sealing flange 46 is screwed on to the mounting flange of the bearing housing 22 by means of countersunk screws 58, one of which is shown, and the sealing flange 46 presses the spacer ring 57 against the outer ring 21, which in turn is pressed against the shoulder 56. The sealing flange 46 seals the end of the bearing assembly which faces the drum 1. If extraordinarily effective sealing is required an O-ring 18 or some other sealing means can be arranged between the bearing housing 22 and the sealing flange 46, substantially as described in connection with FIG. 1.

In an embodiment (not shown) of the bearing assembly according to the invention a spacer ring replaces the locking snap ring 54 and the corresponding locking ring for the other angular contact ball bearing, but it is also possible to make the inner rings so wide that their side surfaces which face each other are in contact so that also the distance ring may be excluded. It is even possible to use merely one double row angular contact ball bearing in back-to-back mounting with a whole outer ring and a split or whole inner ring instead of two single-row angular contact ball bearings.

Figure 5:
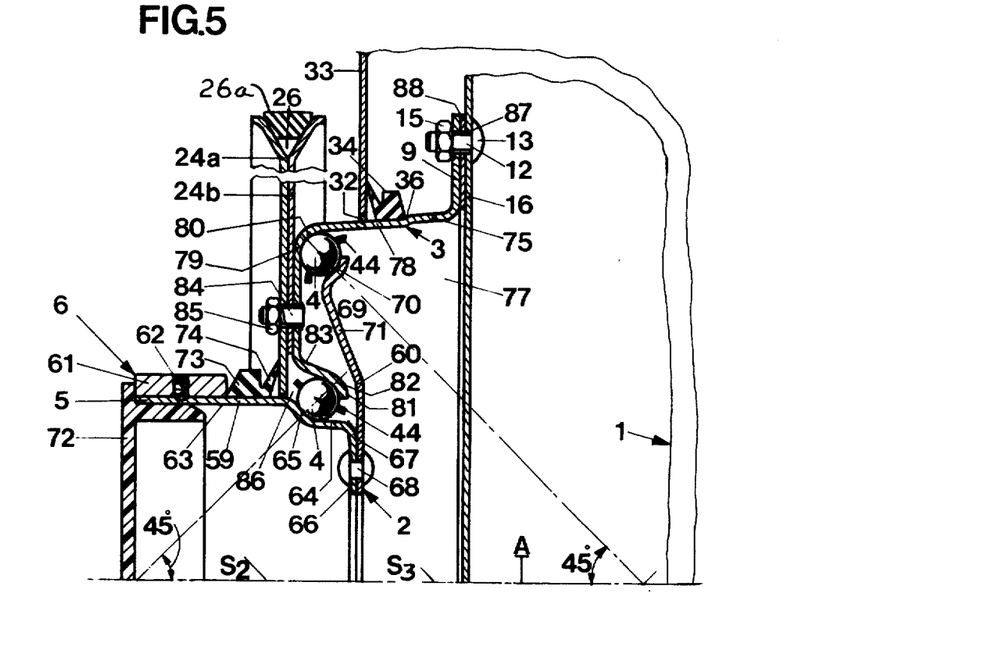

As shown by FIG. 5 outer (3) as well as inner (2) shaft members can be pressed in sheet-steel and have integral raceways for two ball rows which together with the shaft members form a double row angular contact ball bearing with the contact lines of the balls in back-to-back arrangement, i.e. when extending the contact lines in the direction of the bearing shaft the contact lines from one ball row will diverge relative to the contact lines from the outer ball row. Moreover, as also appears from FIG. 5, one ball row can have a larger diameter than the other one and be positioned radially outside it, and the two ball rows may even be positioned in one single plane so as to reduce the construction length of the bearing assembly.

According to the embodiment shown in FIG. 5 the inner shaft member 2 comprises two components of pressed sheet-steel, i.e. one essentially tubular part 59 and another essentially annular flange part 60. The essentially tubular part 59 has a body portion 63 with constant diameter, and one end 5 of this body portion 63 is shown inserted in a steel ring 61 which is comprised in the supporting member 6 and welded on to a frame, not shown in the figure. The end 5 is secured to the steel ring 61 by means of at least two locking screws 62, one of which is shown. At the other end of this body portion 63 there is a portion 64 with reduced diameter, and where these two portions 63 and 64 meet, the raceway 65 for the inner ball row 4 is located. The portion 64 with reduced diameter is integral with an annular flange 66 directed radially inwards, this flange being positioned at the end of the essentially tubular part 59 which is next to the drum 1. The essentially annular flange 60 consists of an inner section 67, which by means of rivets 68 (one of which is shown) is connected with the ring flange 66, an outer section 69 which is bent so as to form the inner raceway 70 for the outer ball row 4, and by an intermediate section 71 interconnecting the inner section 67 and the outer section 69 in such a way that the two ball rows will be placed in one single plane.

The inner shaft member 2 may also comprise a cover or plug 72, e.g. of plastics, which seals the open end 5 of the shaft member 2 so as to prevent dirt from penetrating into the bearing assembly, as well as a seal 73, e.g. a V-ring, which is supported axially by the supporting member 6 and has a sealing lip 74 abutting the outer shaft member 3, thereby preventing dirt from penetrating into the inner ball row. It is, however, also feasible to replace the plug 72 by a smaller plug or a similar stopper means, which is fitted into the central opening of the ring flange 66 or the inner section 67, or by designing the supporting member 6 so as to cover the open end 5 of the smaller shaft member. The seal 73 can, of course, also be replaced by a seal secured to the outer shaft member 3 and abutting the inner shaft member 2.

In the embodiment illustrated in FIG. 5 the outer shaft member 3 comprises three components of pressed sheet-steel, i.e. a bearing housing member 75 and two belt pulley halves 24a and 24b in an axially divisible belt pulley. The bearing housing member 75 has an essentially circular-cylindrical section 78 which is slightly tapered in a direction towards the supporting member 6 and which has a shoulder 36 giving axial support to the V-ring 34 which abuts the inside of the receptacle wall 33. From the end of the section 78 positioned next to the drum 1 a section extends radially outwards, which section forms the mounting flange 9. The section 78 is at its other end formed into an annular flange section 79 extending radially inwards, and where these two sections 78 and 79 meet, the outer raceway 80 for the outer ball row is formed. The bearing housing member 75 further comprises an inner section 81 which is bent so as to form the outer raceway 82 for the inner ball row, and an intermediate section 83 connecting the annular flange section 79 with the inner section 81 in such a way that the two ball rows are placed in one single plane.

A number of stud bolts 84, one of which is shown, are welded on to the annular flange section 79 of the bearing housing member 75 and pass through corresponding holes in the belt pulley halves 24a and 24b, and a nut 85 at the end of each bolt 84 keeps the belt pulley halves together axially and presses the belt pulley against the annular flange section 79. If desired or if it is considered necessary the belt pulley halves can be connected near the V-belt groove 26 by means of spot welding or fasteners (not shown) such as rivets or screw and nut, to prevent the V-belt from pressing the sides of the V-belt groove 26 apart from each other.

The belt pulley half 24a, with which the sealing lip 74 of the V-ring 73 is in sealing engagement, extends nearly as far as to the body portion 63 of the essentially tubular section 59 of the inner shaft member 2, whereas the belt pulley half 24b only extends in to the point in the bearing housing member 75 where the annular flange section 79 changes into the intermediate section 83, thus causing an increase in size of an annular space 86 limited by the belt pulley and the intermediate section 83, which space serves as grease reservoir for the inner ball row.

The outer shaft member 3 is screwed on to the drum 1 by means of a plurality of screws 12, one of which is shown. The screws 12 pass through holes in the rear wall 16 of the drum, a ring seal 88 made of rubber, fibre laminate, soft metal or a similar material, and the mounting flange 9, and these screws have round heads 13 and a nib 87 placed immediately under the head 13. When the nut 15 is tightened this nib 87 is pressed into the drum wall 16 thus preventing the screw 12 from rotating. The essentially circular-cylindrical section 78 of the bearing housing member 75 and the drum wall 16 define a space 77, which serves as grease reservoir for the outer ball row. Both the inner and the outer ball row are provided with cages 44 for the balls.

The contact lines for the balls 4 in the outer ball row intersect the bearing axis ($A$, $S_2$ and $S_3$) in a point positioned inside the drum 1 forming a 45° angle with the bearing axis, and the contact lines for the balls 4 in the inner ball row intersect the bearing axis in a point positioned inside or axially outside that end 5 of the inner shaft member 2 which is adapted to be secured to the supporting member 6, and also the latter contact lines form a 45° angle with the bearing axis.

The embodiment shown in FIG. 6 differs in the following respects from the one shown FIG. 5. The end 5 of the essentially tubular section 59 of the inner shaft member 2 is provided with a ring flange 89 extending radially inwards and having a number of stud bolts 90 welded thereon and extending through a supporting plate 91 included in the supporting member 6, which plate entirely covers the otherwise open end 5 of the inner shaft member 2. A nut 92 is arranged at the free end of each bolt 90 and by tightening the nuts 92 the inner shaft member 2 is rigidly secured to the supporting member 6. Moreover, an axially supporting, relatively low shoulder 93 for the V-ring 73 is provided in the essentially tubular section 59 of the inner shaft member 2, and the rivets 68 joining the pressed sheet-steel main components 59 and 50 of the inner shaft member have been substituted by a plurality of spot welds 94. Furthermore, the belt pulley 24 does not consist of two halves but is one single pressed sheet-steel component, and the intermediate section 83 in the bearing housing member 75 of the outer shaft member 3 is given a curved shape in order to increase the volume of the grease reservoir 86 for the inner ball row. Finally, the ring seal 88 may under favourable circumstances be abandoned, since the grease in the reservoir 77 for the outer ball row together with the centrifugal force caused by the rotation of the drum 1 will prevent impurities from penetrating in between the mounting flange 9 and the drum side 16 and reach the bearings.

The bearing assembly according to FIG. 5 is assembled in the following way. First the essentially tubular section 59 of the inner shaft member 2 is arranged in such a way that its axis $S_2$ will be substantially vertical and its end 5 pointed downwards. The inner ball row with its cage 44 can now be put in place in the raceway 65, and the inner bearing is then completed by lowering the bearing housing member 75 until the raceway 82 is in contact with the balls 4 in the inner ball row. After that the outer ball row with cage 44 is put in place in the raceway 80 and the outer bearing is completed by lowering the annular flange section 60 of the inner shaft member 2 so that it has contact with the balls 4 in the outer ball row as well as with the flange 66 of the essentially tubular section 59 and then securing the flange section 60 to the flange 66 by means of riveting (68) or spot welding (94). The assembled unit can now be turned upside down and the belt pulley 24 or the belt pulley halves 24a and 24b can be mounted over the inner shaft member 2 and fastened by means of the nuts 85. The V-ring 34 is secured to the bearing housing member 75 on a suitable occasion before the belt pulley 24 is mounted, but the V-ring 73 is mounted after the mounting of the belt pulley. The assembling can of course also be carried out in other ways. It is for example possible to start from the annular flange section 60 and first place the outer ball row in the raceway 70, and then lower the outer shaft member 3 with mounted inner ball row and secured belt pulley and thereafter insert the essentially tubular section 59 into the proper place. Finally, the components of the inner shaft member 3 are secured to each other by means of riveting or spot welding. When mounting a prefabricated bearing assembly in a washing machine only the V-ring 73 abutting the belt pulley and the belt pulley itself need be removed to enable mounting of the bearing assembly from the inside into the opening 32 of the receptacle wall 33, and the belt pulley 24 and the V-ring 73 are then mounted again before the bearing assembly is secured to the supporting member 6.

Although the detailed embodiments shown in FIG. 1 and 5 only refer to the design and use of the bearing assembly for washing machines, the bearing assembly as per the present invention can also be used in other machines containing a drum which is rotatable around a predetermined axis, e.g. the drum in a barrel, a sand jet blower, or a similar apparatus, and such modifications of the bearing assembly that may be necessary for this purpose can easily be carried out by a skilled art worked within the scope of the following claims.

I claim:

1. In apparatus for tumbling material comprising a drum having at least one end wall, a support member, a bearing assembly rotatably mounting the drum relative to the support member and drive means for rotating the drum through the bearing assembly, wherein the improved bearing assembly comprises a first, inner shaft member having means adjacent one end for non-rotatably securing it to the support member, a second outer shaft member circumscribing said first shaft member and radially spaced therefrom to define an annular space between said shaft members, means for non-rotatably securing said second outer shaft member to the end wall of the drum at an end thereof opposite said one end of said first shaft member, means for operatively connecting the opposite end of said second outer shaft member to the drive means and a plurality of rolling elements in the annular space between said shaft members supporting said shaft members for relative rotation whereby actuation of the drive means causes rotation of said outer shaft member relative to said inner shaft member to rotate the drum.

2. A bearing assembly as claimed in claim 1 wherein the rolling elements comprise balls of a pair of ball bearing assemblies mounted adjacent opposite axial ends of said outer shaft member, each of said ball bearing assemblies including inner and outer race rings spaced apart to define an annular space for a plurality of balls and a sleeve mounted interiorly of said outer shaft member and spacing the outer race ring of each bearing assembly so that they are disposed adjacent opposite ends of said outer shaft member.

3. A bearing assembly as claimed in claim 1 wherein said outer shaft member includes a radially outwardly directed circumferentially extending flange at said one end including mounting means for securing said one end of said outer shaft member to the end wall of the drum.

4. A bearing assembly as claimed in claim 3 including means defining a groove in the axial end face of said flange facing the drum for mounting a sealing ring therein.

5. A bearing assembly as claimed in claim 3 wherein said means for securing said outer shaft member to the drum includes a plurality of axial openings in said flange, circumferentially spaced about the periphery thereof to receive fastener means for securing said outer shaft member to said drum.

6. A bearing assembly as claimed in claim 5 wherein said fastener means comprises screw members.

7. A bearing assembly as claimed in claim 5 wherein said fastener means comprises rivets.

8. A bearing assembly as claimed in claim 1 wherein said outer shaft member comprises a generally tubular body portion and a mounting flange at one end of said body portion formed integrally therewith.

9. A bearing assembly as claimed in claim 1 wherein at least one of said shaft members is provided with a raceway surface directly engageable by the rolling elements.

10. A bearing assembly as claimed in claim 1 wherein confronting surface portions of said shaft members define raceways directly engageable by the rolling elements.

11. A bearing assembly as claimed in claim 1 wherein the rolling elements are arranged in two rows and wherein said shaft members consist of pressed sheet-steel members having spaced surface portions defining confronting raceways for rolling elements arranged in two rows.

12. A bearing assembly as claimed in claim 11 wherein the outer raceway for each ball row is axially displaced in relation to the corresponding inner raceway to form a double-row angular contact ball bearing with the contact lines in back-to-back arrangement.

13. A bearing assembly as claimed in claim 12 wherein the pitch circle of one of said rows of balls has a larger diameter than the pitch circle of the other row of balls.

14. A bearing assembly as claimed in claim 13 wherein the two ball rows are disposed in a common plane transverse to the axis of rotation of the drum.

15. A bearing assembly as claimed in claim 1 wherein the outer shaft member comprises a generally tubular body portion and a generally circular disc member secured at one end to said body portion and being of a larger diameter than the outer diameter of said tubular body portion to form a radially directed flange.

16. A bearing assembly as claimed in claim 1 including at least one outer race ring for the rolling elements supported in said outer shaft member.

17. A bearing assembly as claimed in claim 1 including at least one inner race ring for the rolling elements mounted on said inner shaft member.

18. A bearing assembly as claimed in claim 1 wherein the shaft members and the rolling elements together comprise a bearing housing and including two deep groove ball bearings each having inner and outer race rings and arranged at a distance axially spaced from one another in the bearing housing.

19. Apparatus for tumbling material comprising a drum having at least one end wall, a support member, drive means for rotating said drum about a predetermined axis and bearing means rotatably mounting said drum consisting of a first inner shaft member having means adjacent one end for non-rotatably securing it to the support member, a second outer shaft member circumscribing said first shaft member radially spaced therefrom to define an annular space between said shaft members, means non-rotatably securing said second outer shaft member to the end wall of said drum at an end thereof opposite said one end of said first shaft member, means for operatively connecting the opposite end of said outer shaft member to the drive means and a plurality of rolling elements in the annular space between said shaft members supporting said shaft members for relative rotation whereby actuation of the drive means causes rotation of said outer shaft member relative to said inner shaft member to rotate the drum.

20. The combination as claimed in claim 19 wherein the drum comprises the rotating member of a washing machine.

21. The combination as claimed in claim 19 wherein the outer shaft member mounts a pulley having at least one groove and wherein said drive means includes a belt transmission means engageable in said groove.

22. The combination as claimed in claim 19 including a housing for the drum having an opening therein and wherein the outer shaft member extends through said opening in the housing, said drive means being disposed exteriorly of said housing and including a seal mounted on the outer shaft member having a flexible lip portion engaging the wall of said housing surrounding said opening.

23. The combination as claimed in claim 22 wherein the outer axial end face of the outer shaft member is provided with a groove for an O-ring to provide a seal between the outer shaft member and said drum.

24. The combination as claimed in claim 19 wherein said drum has at least one imperforate end wall to which said outer shaft member is secured and a cylindrical perforate side wall connected to said end wall.

* * * * *

UNITED STATES PATENT OFFICE
CERTIFICATE OF CORRECTION

Patent No. 3,918,277            Dated November 11, 1975

Inventor(s)    Lembit Nakk

Figure 6:
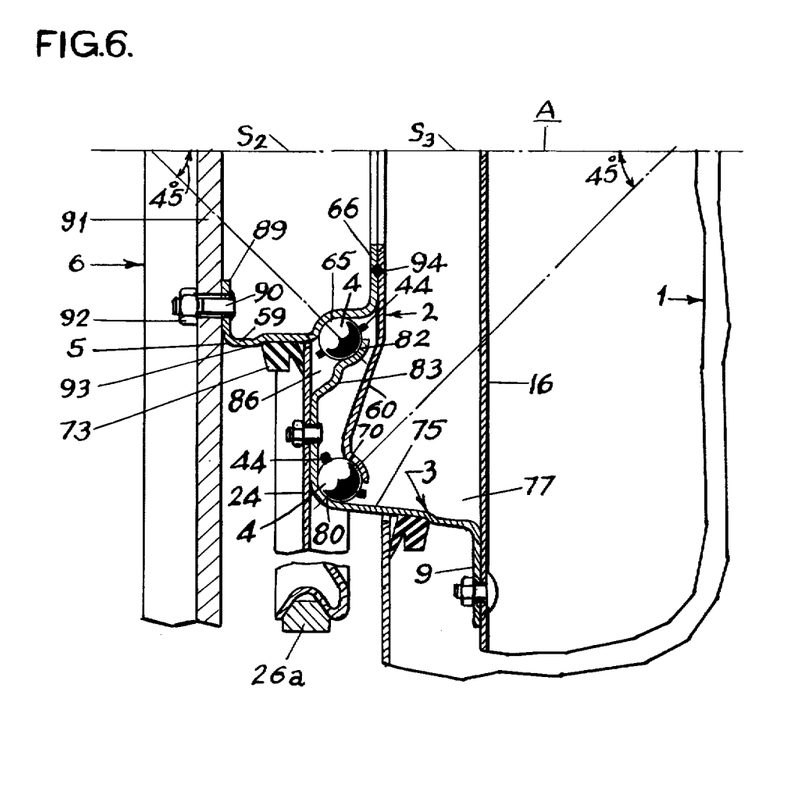

It is certified that error appears in the above-identified patent and that said Letters Patent are hereby corrected as shown below:

Column 1, beginning as a new paragraph after line 59:

the following should have been inserted:

Fig. 5 is a longitudinal sectional view of still another embodiment of bearing assembly in accordance with the present invention; and     Fig. 6 is a longitudinal sectional view of a modified form of bearing assembly similar to that shown in Fig. 5.

Signed and Sealed this sixteenth Day of March 1976

[SEAL]

Attest:

RUTH C. MASON
*Attesting Officer*

C. MARSHALL DANN
*Commissioner of Patents and Trademarks*